United States Patent [19]

Suzuki et al.

[11] Patent Number: 4,626,356
[45] Date of Patent: Dec. 2, 1986

[54] SLUDGE CONCENTRATION METHOD

[75] Inventors: Akira Suzuki, Saitama; Yasumi Shioya, Tokyo; Norio Watanabe, Kanagawa, all of Japan

[73] Assignee: Shinryo Air Conditioning Co., Ltd., Tokyo, Japan

[21] Appl. No.: 813,245

[22] Filed: Dec. 24, 1985

Related U.S. Application Data

[63] Continuation-in-part of Ser. No. 636,585, Aug. 1, 1984, abandoned.

[30] Foreign Application Priority Data

Aug. 22, 1983 [JP] Japan .................................. 58-152939

[51] Int. Cl.$^4$ ............................................ C02F 11/14
[52] U.S. Cl. ..................................... 210/705; 210/727
[58] Field of Search ........ 210/704, 705, 609, 726–728, 210/729, 733

[56] References Cited

U.S. PATENT DOCUMENTS

| | | | |
|---|---|---|---|
| 3,787,316 | 1/1974 | Brink et al. | 210/704 X |
| 3,886,068 | 5/1974 | Eron | 210/704 |
| 4,198,294 | 4/1980 | Deane | 210/704 X |
| 4,203,837 | 5/1980 | Hoge et al. | 210/705 |

Primary Examiner—Tom Wyse
Attorney, Agent, or Firm—Louis Orenbuch

[57] ABSTRACT

A method of sludge concentration comprises forming a froth in the foaming zone by mixing a foaming agent, air and water, mixing the sludge feed with said froth and a polymeric flocculant in a mixing zone, and introducing the resulting mixture of sludge and flocculant into a flotation zone for separating the mixture into a concentrated sludge and water is disclosed.

15 Claims, 4 Drawing Figures

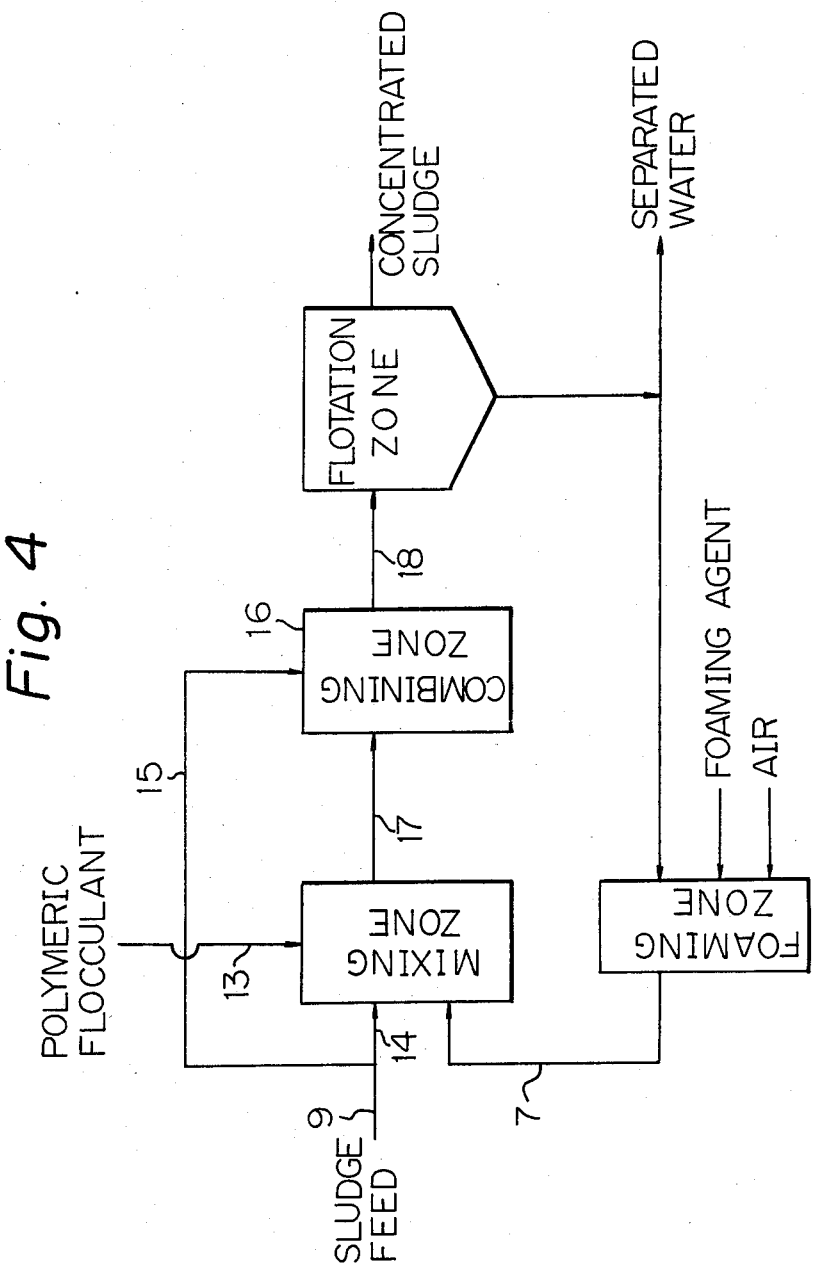

SLUDGE CONCENTRATION METHOD

CROSS-REFERENCE TO RELATED APPLICAION

This application is a continuation-in-part of our earlier patent application Ser. No. 636,585, now abandoned, on our invention of a sludge concentration method. That earlier patent application was filed in the U.S. Patent & Trademark Office on Aug. 1, 1984.

FIELD OF THE INVENTION

This invention relates in general to the clarification of water by the removal of sludge. More particularly, the invention pertains to a flotation method for concentrating the sludge to facilitate its separation from the water.

BACKGROUND OF THE INVENTION

The present invention relates to an improved method of sludge concentration and more particularly pertains to a sludge flotation method that uses less flocculating agent than is required in conventional flotation methods.

Flotation methods are extensively used for sludge concentration. According to a pressurized flotation concentration method, clarified water having air dissolved at a pressure of 4-5 kg/cm$^2$ is mixed with the sludge, and the resulting fine bubbles are used to cause concentrated flocs of solids to float on the surface of the liquid mixture. This method not only requires high power consumption for pressurizing air but also involves much difficulty in achieving high sludge concentration since the air bubbles are bonded to the sludge solids merely by weak physical adsorption.

Commonly assigned Japanese Laid-Open Patent Application No. 40499/81 discloses an atmospheric flotation method as a new technique for concentrating sludge without incurring the disadvantages of the conventional method. According to this new method, air is introduced at atmospheric pressure into a liquid phase containing foaming agent and flocculating agents so as to evolve a froth, which is mixed with the sludge, and the mixture is sent to a flotation tank for concentrating the sludge solids by flotation. This method is superior to the pressurized flotation technique in that it provides an inexpensive and simple process for achieving a high concentration of sludge.

SUMMARY OF THE INVENTION

The primary objective of the present invention is to provide an improved method of atmospheric flotation concentration which ensures consistent and high concentration of sludge using a very much smaller amount of flocculant than is conventionally required.

The present invention provides a method of sludge concentration comprising forming a froth by mixing a foaming agent, air, and water in a foaming zone, mixing said froth and a polymeric flocculant with a sludge feed in a mixing zone, and introducing the resulting mixture into a flotation zone for separation into concentrated sludge and water.

BRIEF DESCRIPTION OF THE DRAWINGS

FIGS. 1 and 4 are flow sheets for two embodiments of the method of the present invention;

DETAILED DESCRIPTION OF THE PREFERRED EMBODIMENTS

Figure 1:
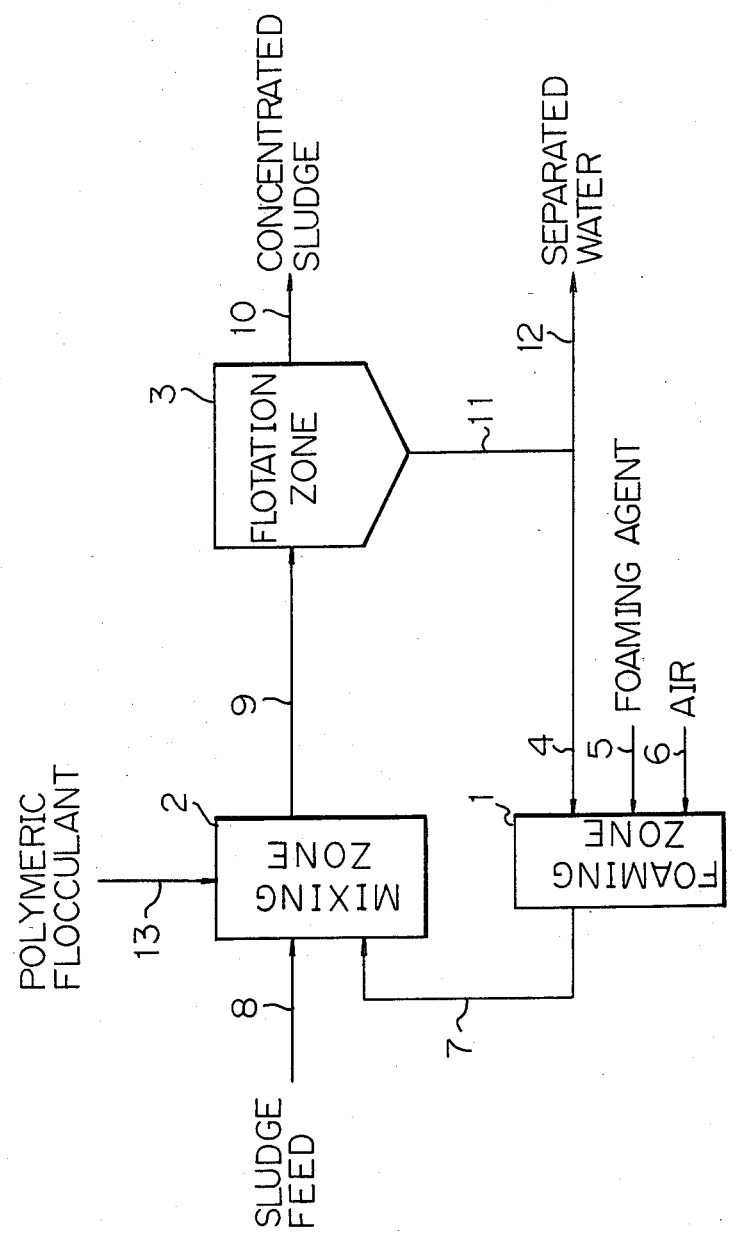

The present invention is here described in detail by reference to the embodiments shown in the accompnying drawings. FIG. 1 is a flowsheet for one embodiment of the method of the present invention. A foaming zone generally indicated at 1 consists of an agitation vessel, a froth accommodating chamber, a liquid separating chamber for separating a chemical from the froth, a froth outlet and a recirculating means for returning the separated chemical to the agitation vessel. The foaming zone may be composed of only the agitation vessel. The foaming zone 1 is fed with clarifiied water, a foaming agent, and air through respective lines 4, 5 and 6. The clarified water may be replaced by separated water coming from a flotation zone 3 to be described later. Instead of directly feeding the foaming agent into the foaming zone 1 through line 5, it may be mixed with the clarified water and fed over line 4, or a powder of the foaming agent may be mixed with air and fed through line 6. Any compound that is sufficiently suitable for froth formation may be used as a foaming agent, and typical examples are cationic surfactants such as alkylamine and quaternary ammonium salts. The froth coming out of the foaming zone 1 consists of fine bubbles, the size of which may be controlled by adjustment of the rotating speed of an impeller within the foaming zone. For the purpose of the present invention, a froth comprising bubbles of a diameter of 300-500 m is preferred.

In the conventional method, a polymeric flocculant is also fed into the foaming zone. However, this is not the case with the present invention, and instead, as shown below, the polymeric flocculant is fed into a mixing zone 2. The froth from the foaming zone 1 is supplied into the mixing zone 2 over a line 7, and the polymeric flocculant is fed into a mixing zone through a line 13. In the mixing zone 2, the sludge feed coming through line 8 is mixed with the froth and flocculant. In the embodiment of FIG. 1, the froth and flocculant are introduced into one and the same mixing zone. If desired, the mixing zone may consist of a first mixing zone wherein the froth is mixed with the sludge, and a second mixing zone for incorporating the polymeric flocculant into the sludge-froth mixture.

Figure 2:
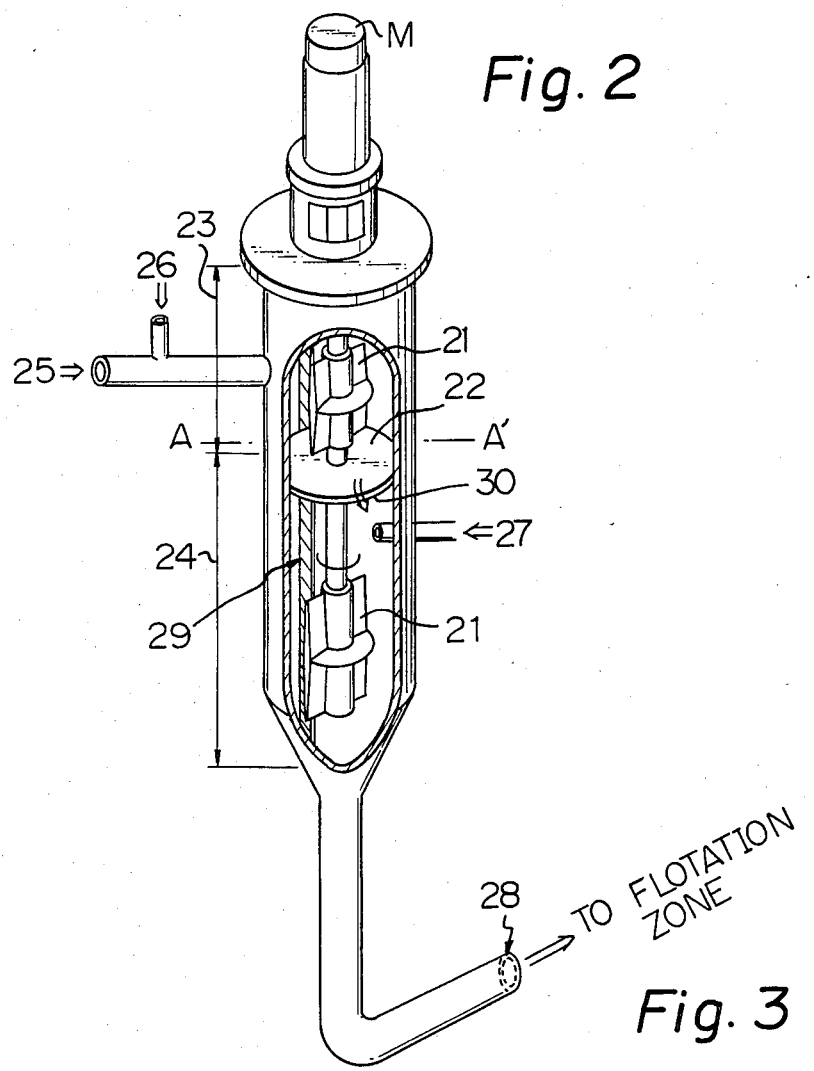
FIG. 2 is a perspective view showing the mixing device that may be used in the method of the present invention.
Figure 3:
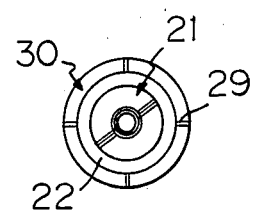
FIG. 3 is a cross-sectional view taken on line A—A' of FIG. 2.

A mixing device that can be used with advantage for treating sludge by the method of the present invention is shown in FIG. 2. The device is a cylindrical mixing vessel having two impellers 21 mounted on a shaft and consists of a first mixing zone 23 separated from a second mixing zone 24 by a partition 22. Sludge 25 and froth 26 are introduced into the first mixing zone 23 through respective inlets and mixed by the rotation of one impeller 21. The sludge-froth mixture obtained in the first mixing zone 23 enters the second mixing zone 24 through the clearance between the partition 22 and the inner wall of the mixing vessel. A vortex of the sludge-froth mixture is formed by the rotating action of the other impeller 21 and entraps a separately supplied polymeric flocculant 27. The resulting sludge-flocculant mixture is sent to the floating zone 3 through an outlet 28.

The polymeric flocculant used in the present invention may be anionic, cationic or nonionic, and a suitable type may be selected depending upon the nature and properties of the sludge feed. If the feed is excess sludge, a cationic poly(methacrylate ester) is a suitable flocculant.

The mixture of sludge and flocculant produced in the mixing zone 2 is introduced into the flotation zone 3 where the mixture is separated into a concentrated sludge and water. The concentated sludge is recovered through a line 10 and subjected to a subsequent treatment. The water separated from the concentrated sludge in the flotation zone 3 is discharged from the system through lines 11 and 12. Part of the separated water drawn from the bottom of the flotation zone 3 may be used as clarified water that enters the foaming zone 1 through line 4. The flotation zone 3 may be equipped with a rotating scraper for removal of the concentrated sludge.

Another embodiment of the present invention is shown in FIG. 4 where the components which are the same as those shown in FIG. 1 are identified by the same numerals. In the embodiment of FIG. 4, the sludge feed is divided into two portions which are respectively conveyed through lines 14 and 15. The proportion of the sludge that is conveyed through the line 14 depends on the type and solids concentration of the sludge and is typically in the range of 20-80% of the total sludge feed. The preferred proportion is between 40% and 60% of the total sludge feed. The sludge conveyed through line 14 enters the mixing zone 2 where it is mixed with the froth and polymeric flocculant respectively fed through lines 7 and 13. In the mixing zone, the sludge may be mixed with the froth and flocculant simultaneously. Alternatively, the sludge may be first mixed with the froth, and the resulting sludge-froth mixture is mixed with the flocculant. The sludge-flocculant mixture leaving the mixing zone 2 enters a combining zone 16 through a line 17, and is mixed with the other part of the sludge conveyed through line 15. The resulting mixture is sent to the flotation zone 3 through a line 18 for separation into a concentrated sludge and water.

The mixing zone 2 may contain a heating means for heating the sludge conveyed through the line 14 or the sludge-froth mixture of sludge-flocculant mixture formed in the mixing zone 2. Whichever product is heated, a predetermined heating temperature must be observed. The heating temperature is at least 40° C., preferably 60° C. or more.

The method of the present invention ensures a consistent and high concentration of sludge using a much smaller amount of polymeric flocculant than is conventionally required. In the conventional method, froth is formed by introducing air, a foaming agent, a flocculant, and water into the foaming zone. The surface of each bubble is charged either positively or negatively since it has the polymeric flocculant adsorbed thereon. If the froth consisting of charged bubbles is mixed with the sludge, the two are bonded electrochemically. However, if the foaming agent and flocculant are simultaneously introduced into the foaming zone, the foaming agent impairs the agglomerating activity of the flocculant and the desired flocculating effect is not achieved unless a large amount of the flocculant is used.

According to the present invention, the polymeric flocculant is not fed into the foaming zone, and only air, foaming agent, and water are introduced for making a froth. If the froth and polymeric flocculant are simultaneously added to the sludge, or if the flocculant is added to a premixture of sludge and froth, the flocculant binds solid particles in a dispersed sludge so as to form a large flocs of sludge having a froth incorporated therein. According to the conventional method, a mixture of foaming agent and flocculant is adsorbed on the bubble surface, so the foaming agent impairs the activity of the flocculant. This does not occur in the present invention because the flocculant, which is added to the sludge simultaneously with the froth or to a prepared mixture of sludge and froth, contacts the sludge by itself and forms a floc of sludge solids having a froth incorporated therein. This is the reason why less flocculant need by used in the method of the present invention.

Further reduction in the amount of the flocculant can be realized by the following method. Part of the sludge feed is intimately mixed with the froth and polymeric flocculant so as to adsorb the flocculant uniformly on the surface of solid particles in the sludge, and thereafter, the mixture is blended with the remainder of the sludge feed. The solids of this remaining sludge will form flocs by being bound to the solids in the other part of the sludge through flocculant particles adsorbed on their surface. This enables a further effective utilization of the flocculant. The purpose of mixing the first part of the sludge with the froth and flocculant is to cover the surface of the solids in that part of the sludge with the flocculant, so a great agitating force and a prolonged agitation time may be employed. This increases the amount of the flocculant that is adsorbed in the sludge while reducing the amount of the flocculant that is released into free water. Even the flocculant that is released into the free water is used effectively by being adsorbed onto the remaing sludge. By heating the first part of the sludge when it is mixed with the froth and polymeric flocculant, the rate of adsorption of the flocculant to the solids in the sludge can be increased, and as a result, the amount of the flocculant contained in free water can be decreased further.

The desired advantages of the present invention are not achieved if the froth is mixed with a preformed mixture of the sludge and the flocculant. The timing of the addition of the polymeric flocculant to the sludge is critical to the present invention and the flocculant must be added either simultaneously with or after the addition of the froth.

The primary sources of the sludge to be treated by the method of the present invention are those which contain several hundred ppm to several tens of thousand of ppm of suspended solids, and typical examples are excess sludge from the step of activated sludge treatment, digested sludge from the anaerobic digesting step, waste water from mines, and waste pulp liquors. It has been found that the present invention achieves particularly significant results when it is used to treat excess sludge.

EXAMPLE 1

Excess sludge from the step of activated sludge treatment was concentrated by the method of the present invention using apparatus of the type shown in FIG. 1. The solids in the sludge had an apparent specific gravity of 1.03 and a pH of 6.8.

To the clarified water separated from the flotation tank, 0.05 to 0.15 g of one of the foaming agents listed in Table 1 per liter of the clariefied water was added. The mixture was supplied to the foaming vessel where it was mechanically agitated with a homogenizer and the froth which formed was forced into the first mixing chamber where it was mixed with the sludge that entered the chamber at the rate of 2 liters per minute. After about one minute of mixing by agitation, the froth-sludge mixture was sent to the second mixing chamber, where it was mixed for about one minute with a solution having one of the polymeric flocculants listed in Table 1 dissolved in clarified water in an amount of 5 g per liter of clarified water. The resulting mixture was sent to the flotation separation tank where the solids were separated from the sludge by flotation over a period of about 30 minutes. The results obtained are set forth in Table 1.

added. The mixture was supplied to the foaming vessel where it was mechanically agitated with a homogenizer, and the froth formed were forced into the first mixing chamber where they were mixed with the sludge coming in a rate of 2 liters per minute. After about one minute of mixing under agitation, the froth-sludge mixture was sent to the second mixing chamber, where it was mixed for about one minute with a solution having a poly(methacrylate ester) (polymeric flocculant) dissolved in clarified water in an amount of 5 g per liter of the clarified water. The resulting mixture was sent to the flotation separation tank where the solids were separated from the sludge by flotation over a period of about 30 minutes. The results obtained are set forth in Table 1.

TABLE 1

| No. of Example | Foaming agent | Polymeric flocculant | Sludge concentration (ppm) | Froth content (%) | Gas-solids ratio (kg-air/kg-solids) | Amount of foaming agent (ppm) | Amount of polymeric flocculant (ppm) | Solids content of concentrated sludge (%) | SS concentration of separated water (ppm) |
|---|---|---|---|---|---|---|---|---|---|
| 1-A | lauryl trimethyl ammonium chloride (cationic) | poly(methacrylate ester) | 6868 | 30 | 0.045 | 6.3 | 10 | 8.1 | 15 |
|  |  |  | 10820 | 20 | 0.019 | 4.2 | 16 | 9.1 | 21 |
|  |  |  | 10820 | 30 | 0.028 | 6.3 | 16 | 9.6 | 20 |
|  |  |  | 16830 | 30 | 0.018 | 4.2 | 26 | 9.8 | 28 |
|  |  |  | 16830 | 40 | 0.024 | 8.4 | 26 | 10.5 | 26 |
| 1-B | sodium lauryl sulfate (anionic) | poly(methacrylate ester) | 5670 | 30 | 0.045 | 6.4 | 10 | 8.2 | 12 |
|  |  |  | 8510 | 20 | 0.019 | 4.3 | 15 | 8.8 | 15 |
|  |  |  | 12760 | 30 | 0.028 | 6.4 | 15 | 9.1 | 15 |
| 1-C | lauryl dimethyl amino acetic acid betaine (amphoteric) | copolymer of sodium acrylate and acrylamide | 5930 | 30 | 0.045 | 6.3 | 10 | 8.2 | 12 |
|  |  |  | 8890 | 20 | 0.019 | 4.2 | 15 | 9.0 | 10 |
|  |  |  | 13330 | 30 | 0.028 | 6.4 | 15 | 9.2 | 15 |
| 1-D | stearyl trimethyl ammonium chloride (cationic) | copolymer of methacrylate ester and acrylamide | 5480 | 30 | 0.045 | 6.2 | 10 | 8.1 | 15 |
|  |  |  | 8220 | 20 | 0.019 | 4.1 | 15 | 8.7 | 10 |
|  |  |  | 12330 | 30 | 0.028 | 6.2 | 15 | 9.0 | 15 |
| 1-E | polyoxyethylene alkylether (nonionic) | polyacrylamide | 5530 | 30 | 0.045 | 3.1 | 10 | 8.0 | 13 |
|  |  |  | 8290 | 20 | 0.019 | 2.1 | 15 | 8.7 | 15 |
|  |  |  | 12440 | 30 | 0.028 | 3.1 | 15 | 8.9 | 15 |
| 1-F | stearyl trimethyl ammonium chloride (cationic) | copolymer of sodium acrylate and acrylamide | 5470 | 30 | 0.045 | 6.2 | 11 | 8.0 | 10 |
|  |  |  | 8450 | 20 | 0.019 | 3.9 | 14 | 8.8 | 12 |
|  |  |  | 12590 | 30 | 0.028 | 6.2 | 15 | 9.1 | 12 |
| 1-G | polyoxyethylene alkylether (nonionic) | polymethacrylate ester | 5620 | 30 | 0.045 | 3.1 | 11 | 7.9 | 12 |
|  |  |  | 8630 | 20 | 0.019 | 2.1 | 14 | 8.7 | 10 |
|  |  |  | 11980 | 30 | 0.028 | 3.1 | 16 | 9.0 | 10 |
| 1-H | polyoxyethylene alkylether (nonionic) | copolymer of methacrylate ester and acrylamide | 5530 | 30 | 0.045 | 3.0 | 10 | 8.1 | 8 |
|  |  |  | 8520 | 20 | 0.019 | 2.2 | 15 | 8.8 | 12 |
|  |  |  | 12170 | 30 | 0.028 | 3.1 | 15 | 9.1 | 12 |
| 1-I | sodium lauryl sulfate (anionic) | polyacrylamide | 5360 | 30 | 0.045 | 6.3 | 10 | 7.9 | 10 |
|  |  |  | 7150 | 20 | 0.019 | 4.5 | 15 | 8.3 | 15 |
|  |  |  | 10720 | 30 | 0.028 | 6.3 | 10 | 8.8 | 10 |

EXAMPLE 1A

Excess sludge from the step of activated sludge treatment was concentrated by the method of the present invention using an apparatus of the type shown in FIG. 1. The solids in the sludge had an apparent specific gravity of 1.03 and a pH of 6.8.

To the clarified water separated from the flotation tank, 0.15 g of lauryltrimethylammonium chloride (foaming agent) per liter of the clarified water was

COMPARATIVE EXAMPLE

Sludge having the same properties as treated in Example 1 was concentrated by the conventional method wherein a foaming agent and a flocculant were simultaneously added to the foaming zone. The results are tabulated in Table 2 below.

TABLE 2

| Sludge concentration (ppm) | Froth content (%) | Gas-solids ratio (kg-air/kg-solids) | Amount of foaming agent (ppm) | Amount of polymeric flocculant (ppm) | Solids content of concentrated sludge (%) | SS concentration of separated water (ppm) |
|---|---|---|---|---|---|---|
| 7230 | 30 | 0.042 | 6.3 | 13 | 8.0 | 22 |
| 10240 | 30 | 0.030 | 6.3 | 18 | 8.9 | 26 |
| 11420 | 30 | 0.027 | 6.3 | 21 | 9.4 | 24 |
| 18340 | 40 | 0.022 | 8.4 | 35 | 10.8 | 28 |

As one can see from Tables 1 and 2, the method of the present invention achieved a sufficiently high concentration of sludge using about 20% less polymeric floccculant than is required in the conventional method.

EXAMPLE 2

Excess sludge resulting from the step of activated sludge treatment was concentrated by the method of the present invention using an apparatus of the type shown in FIG. 4. The solids in the sludge had an apparent specific gravity of 1.03 and a pH of 6.8. To the clarified water separated from the flotation tank, 0.15 g of lauryltrimethylammonium chloride (foaming agent) per liter of the clarified water was added, and the mixture was supplied to the foaming apparatus where it was mechanically agitated with a homogenizer. The froth formed was forced into the first mixing chamber where it was mixed with predetermined proportions of the sludge feed entering at a rate of 2 liters per minute. After about one minute of mixing under agitation, the froth-sludge mixture was was sent to the second mixing chamber where it was mixed for about one minute with a solution having 0.25 to 0.4 g per liter of the clarified water with a poly(methacrylate ester) (polymeric flocculant) dissolved therein. Subsequently, the mixture was blended with the remaining part of the sludge feed for about one minute. The resulting mixture was then sent to the flotation tank where the solids were separated from the sludge by flotation over a period of about 30 minutes. The results obtained are shown in Table 3. The other conditions used were as follows: sludge concentration, 11080 ppm; amount of foaming agent, 6.3 ppm; froth content, 30%; and gas-sold ratio, 0.028 kg-air/kg-solids.

An experiment was conducted in the same manner as above except that 50% of the sludge feed was separated and mixed with a froth in the first mixing chamber. The results and other process conditions used are shown in Table 4.

TABLE 3

| Proportion of separated sludge feed (%) | Amount of polymeric flocculant (ppm) | Solids content of concentrated sludge (%) | SS Concentration of separated water (ppm) | Polymer concentration of separated water (ppm) |
| --- | --- | --- | --- | --- |
| 20 | 16 | 9.4 | 24 | 0.9 |
| 40 | 14 | 9.5 | 26 | 0.6 |
| 60 | 13 | 9.2 | 28 | 0.7 |
| 80 | 16 | 9.5 | 22 | 1.0 |
| 100 | 17 | 9.2 | 27 | 1.2 |

TABLE 4

| sludge concentration (ppm) | Froth content (%) | Gas-solids ratio (kg-air/kg-solids) | Amount of foaming agent (ppm) | Amount of polymeric flocculant (ppm) | Solids content of concentrated sludge (%) | SS concentration of separated water (ppm) |
| --- | --- | --- | --- | --- | --- | --- |
| 8075 | 30 | 0.038 | 6.3 | 10 | 8.2 | 17 |
| 11300 | 30 | 0.027 | 6.3 | 14 | 9.4 | 24 |
| 17250 | 40 | 0.024 | 8.4 | 21 | 10.3 | 27 |

*50% sludge feed separated

The data in Tables 3 and 4 shows that according to one embodiment of the present invention wherein part of the sludge feed is first mixed with a froth, about 30% reduction in the amount of the polymeric flocculant can be achieved as compared with the conventional method.

As will be understood from the foregoing description, the present invention makes effective use of the polymeric flocculant by causing it to work as a binder for dispersed flocs of sludge solids. Therefore, the amount of flocculant that must be used in the present invention is about 20%–30% smaller that is conventionally required. As a further advantage, the froth and polymeric flocculant are added separately, so the amounts of the two components may be adjusted independently of each other according to the specific properties of the sludge to be treated. Therefore, the present invention permits the use of the foaming agent and polymeric flocculant in minimum amounts.

We claim:

1. A method of sludge concentration comprising the steps of
   (a) forming a froth in a foaming zone by mixing a surfactant foaming agent, air and water,
   (b) mixing the sludge feed with said froth and a cationic polymeric flocculant in a mixing zone, and
   (c) introducing the resultant mixture of sludge and flocculant into a flotation zone for separatting the mixture into a concentrated sludge and water.

2. The method according to claim 1 wherein in step b the froth and cationic polymeric flocculant are simultaneously mixed with the sludge in said mixing zone.

3. The method according to claim 1 wherein in step b the froth is first mixed with the sludge in said mixing zone and the resulting sludge-froth mixture is mixed with the cationic polymeric flocculant.

4. A method of sludge concentration comprising the steps of
   (a) forming a froth in a foaming zone by mixing a surfactant foaming agent, air and water,
   (b) separating part of the sludge feed,
   (c) mixing said separated sludge feed with said froth and a cationic polymeric flocculant in a mixing zone,
   (d) mixing the resulting mixture of the sludge and flocculant with the remainder of the sludge feed in a combining zone, and
   (e) introducing the resulting mixture into a flotation zone for separating the mixture into a concentrated sludge and water.

5. The method according to claim 4 wherein in step c the froth and cationic polymeric flocculant are simultaneously mixed with the separated sludge feed in said mixing zone.

6. The method according to claim 4 wherein in step c the froth is mixed with said separated sludge feed in said mixing zone and the resulting sludge-froth mixture is blended with the cationic polymeric flocculant.

7. The method according to claim 4, 5, or 6 wherein in step b said separated sludge is 40% to 60% of the total sludge feed.

8. The method according to claim 1, wherein in step b the surfactant foaming agent is cationic and is selected from the class of alkylamine and quarternary ammonium salts.

9. The method according to claim 8 wherein the foaming agent is lauryltrimethylammonium chloride.

10. The method according to claim 8, wherein in step b the cationic flocculant is a polymethacrylate.

11. The method according to claim 10 wherein the cationic flocculant is a methacrylate ester.

12. The method according to claim 4 wherein in step a the cationic surfactant foaming agent is a quarternary ammonium salt.

13. The method according to claim 12 wherein the quarternary ammonium salt is lauryltrimethylammonium chloride.

14. The method according to claim 12 wherein in step c the cationic flocculant is a polymethacrylate.

15. The method according to claim 14 wherein the cationic flocculant is a methacrylate ester.

* * * * *